(12) United States Patent
Guo et al.

(10) Patent No.: US 10,203,429 B2
(45) Date of Patent: Feb. 12, 2019

(54) LIGHT REFRACTION STRUCTURE AND ITS MANUFACTURE METHOD, COLOR FILTER SUBSTRATE AND ITS MANUFACTURE METHOD, AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Yuanhui Guo, Beijing (CN); Yuansheng Zang, Beijing (CN); Hui Wang, Beijing (CN); Chun Wang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 294 days.

(21) Appl. No.: 15/130,115

(22) Filed: Apr. 15, 2016

(65) Prior Publication Data
US 2016/0313471 A1    Oct. 27, 2016

(30) Foreign Application Priority Data

Apr. 21, 2015 (CN) .......................... 2015 1 0190674

(51) Int. Cl.
*G02B 1/00* (2006.01)
*G02B 5/20* (2006.01)
*G02F 1/1335* (2006.01)
(52) U.S. Cl.
CPC ............... *G02B 1/007* (2013.01); *G02B 5/20* (2013.01); *G02F 1/133514* (2013.01); *G02F 1/133516* (2013.01)

(58) Field of Classification Search
CPC ..... G02B 1/007; G02B 5/20; G02F 1/133514; G02F 1/133516
(Continued)

(56) References Cited

U.S. PATENT DOCUMENTS 7,580,186 B2   8/2009   Mather et al.
8,797,647 B2   8/2014   Wu
(Continued)

FOREIGN PATENT DOCUMENTS

CN   1591088 A   3/2005
CN   1617014 A   5/2005
(Continued)

OTHER PUBLICATIONS

Second Office Action for Chinese Application No. 201510190674.7, dated Feb. 24, 2017, 9 Pages.

*Primary Examiner* — William R Alexander
*Assistant Examiner* — Grant A Gagnon
(74) *Attorney, Agent, or Firm* — Brooks Kushman P.C.

(57) ABSTRACT

The present disclosure provides a light refraction structure and its manufacture method, a color filter substrate and its manufacture method, and a display device. The method for manufacturing the light refraction structure includes steps of: forming on a base substrate a plurality of light-shielding stripes parallel to each other, and forming a protrusion made of a transparent material between the adjacent light-shielding stripes, wherein the protrude is capable of refracting a light beam from the base substrate in a direction close to the light-shielding stripe.

20 Claims, 3 Drawing Sheets

(58) Field of Classification Search
USPC .......................................................... 359/885
See application file for complete search history.

(56) References Cited

U.S. PATENT DOCUMENTS

| | | | |
|---|---|---|---|
| 9,244,204 B2* | 1/2016 | Kashiwagi | G02B 5/223 |
| 9,304,352 B2 | 4/2016 | Li et al. | |
| 9,846,320 B2* | 12/2017 | Lin | G02F 1/1323 |
| 2009/0040426 A1 | 2/2009 | Mather et al. | |
| 2012/0262654 A1* | 10/2012 | Moriwaki | G02F 1/133512 |
| | | | 349/106 |

FOREIGN PATENT DOCUMENTS

| | | |
|---|---|---|
| CN | 102236201 A | 11/2011 |
| CN | 102768424 A | 11/2012 |
| GB | 2405516 A | 3/2005 |
| JP | 2008040027 | 2/2008 |

* cited by examiner

LIGHT REFRACTION STRUCTURE AND ITS MANUFACTURE METHOD, COLOR FILTER SUBSTRATE AND ITS MANUFACTURE METHOD, AND DISPLAY DEVICE

CROSS-REFERENCE TO RELATED APPLICATION

The present application claims a priority of the Chinese patent application No. 201510190674.7 filed on Apr. 21, 2015, which is incorporated herein by reference in its entirety.

TECHNICAL FIELD

The present disclosure relates to the field of display technology, in particular to a light refraction structure and its manufacture method, a color filter substrate and its manufacture method, and a display device.

BACKGROUND

For a dual-viewing-angle display mode, a user may view different images on a dual-viewing-angle display device at different viewing angles. As compared with a conventional display device, it is able for dual-viewing-angle display device to display two different images on a same display panel. Currently, the dual-viewing-angle display device has been widely used in such fields as vehicles and advertising screens, especially in high-end vehicles.

However, only small viewing angles are provided in the dual-viewing-angle display device. For example, an image that should have been viewed at a right viewing angle may be viewed at a left viewing angle when the left viewing angle goes beyond a certain range, and at this time, it is unable to provide a dual-viewing-angle display effect. As shown in FIG. 1, which is a schematic view showing the dual-viewing-angle display effect for a dual-viewing-angle display device in the related art, the confusion in the viewing angles may easily occur in a middle region and two lateral regions in front of the display device. This confusion is mainly caused by color crosstalk in the middle region, and it may be avoided by controlling an aperture ratio of a grating on a surface of the dual-viewing-angle display device. Usually, the brightness of the dual-viewing-angle display device may increase along with an increase in the aperture ratio, but at this time, more serious color crosstalk may occur; in contrast, a side viewing angle and the brightness of the dual-viewing-angle display device may decrease along with a decrease in the aperture ratio.

There is no effective scheme in the related art for resolving the above-mentioned drawbacks.

SUMMARY

A main object of the present disclosure is to increase a side viewing angle as well as brightness of a dual-viewing-angle display device, thereby to increase a user's viewing angle for viewing an image on the display device.

For achieving the above objection, the present disclosure provides a light refraction structure and its manufacture method, a color filter substrate and its manufacture method, and a display device.

In one aspect, the present disclosure provides in some embodiments a light refraction structure, including a base substrate, a plurality of light-shielding stripes arranged on the base substrate and parallel to each other, and a protrusion made of a transparent material and arranged between the adjacent light-shielding stripes, wherein the protrude is capable of refracting a light beam from the base substrate in a direction close to the light-shielding stripe.

Alternatively, a cross section of the protrusion in a direction perpendicular to a lengthwise direction of the light-shielding strip is of a semi-circular, semi-elliptical, conical, trapezoidal or rectangular shape, and when the cross section of the protrusion is of a trapezoidal shape, a baseline of the trapezoid in contact with a surface of the base substrate is of a length greater than a length of another baseline of the trapezoid.

Alternatively, when the cross section of the protrusion is of a trapezoidal shape, the trapezoid is an isosceles trapezoid.

Alternatively, the transparent material is a resin material having negative photosensitivity.

Alternatively, the base substrate is a glass substrate.

Alternatively, the glass substrate is of a thickness greater than or equal to 0.05 mm and less than or equal to 0.1 mm.

Alternatively, the transparent material is of a refractive index less than or equal to 1.

In another aspect, the present disclosure provides in some embodiments a color filter substrate, on which the above-mentioned light refraction structure is formed. The base substrate of the light refraction structure is a base substrate of the color filter substrate.

Alternatively, a black matrix and a color filter are arranged at a side of the base substrate away from the light refraction structure.

In yet another aspect, the present disclosure provides in some embodiments a display device including the above-mentioned light refraction structure or color filter substrate.

Alternatively, the display device is a dual-viewing-angle display device.

In still yet another aspect, the present disclosure provides in some embodiments a method for manufacturing a light refraction structure, including steps of: forming on a base substrate a plurality of light-shielding stripes parallel to each other, and forming a protrusion made of a transparent material between the adjacent light-shielding stripes, wherein the protrude is capable of refracting a light beam from the base substrate in a direction close to the light-shielding stripe.

Alternatively, the step of forming the protrusion made of the transparent material between the adjacent light-shielding stripes includes forming a light refraction layer made of the transparent material on the adjacent light-shielding stripes, and exposing and developing the light refraction layer to obtain the protrusion. The transparent material is a resin material having negative photosensitivity. A cross section of the protrusion in a direction perpendicular to a lengthwise direction of the light-shielding strip is of a semi-circular, semi-elliptical, conical, trapezoidal or rectangular shape, and when the cross section of the protrusion is of a trapezoidal shape, a baseline of the trapezoid in contact with a surface of the base substrate is of a length greater than a length of another baseline of the trapezoid.

Alternatively, the step of exposing the light refraction layer includes exposing the light refraction layer from one side of the base substrate opposite to the other side of the base substrate where the light refraction layer is arranged.

In still yet another aspect, the present disclosure provides in some embodiments a method for manufacturing a color filter substrate, including steps of: forming on a base substrate of the color filter substrate a plurality of light-shielding stripes parallel to each other, and forming a protrusion made of a transparent material between the adjacent light-shielding stripes, wherein the protrusion is capable of refracting a light beam from the base substrate in a direction close to the light-shielding stripe.

Alternatively, the step of forming the protrusion made of the transparent material between the adjacent light-shielding stripes includes forming a light refraction layer made of the transparent material on the adjacent light-shielding stripes, and exposing and developing the light refraction layer to obtain the protrusion. The transparent material is a resin material having negative photosensitivity. A cross section of the protrusion in a direction perpendicular to a lengthwise direction of the light-shielding strip is of a semi-circular, semi-elliptical, conical, trapezoidal or rectangular shape, and when the cross section of the protrusion is of a trapezoidal shape, a baseline of the trapezoid in contact with a surface of the base substrate is of a length greater than a length of another baseline of the trapezoid.

Alternatively, the step of exposing and developing the light refraction layer includes exposing and developing the light refraction layer from a side of the base substrate where the light refraction layer is arranged.

According to the light refraction structure and its manufacture method, the color filter substrate and its manufacture method, and the display device in the embodiments of the present disclosure, through the transparent protrusion capable of enlarging the viewing angle and arranged on a grating structure of a dual-viewing-angle display device, it is able to effectively increase a side viewing angle as well as brightness of the dual-viewing-angle display device, and prevent the occurrence of color crosstalk in a middle region in front of the dual-viewing-angle display device.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
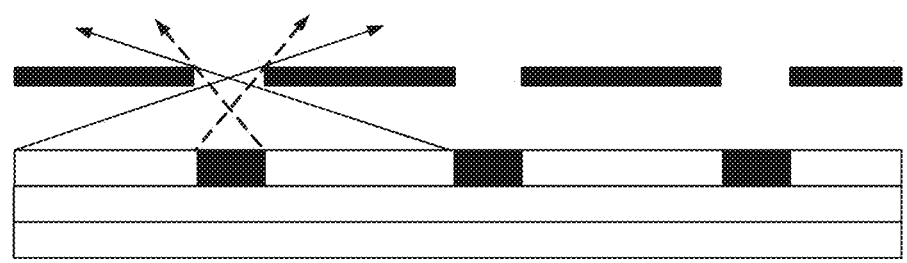
FIG. 1 is a schematic view showing dual-viewing-angle display for a dual-viewing-angle display device in the related art.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a light refraction structure, which includes a base substrate, a plurality of light-shielding stripes arranged on the base substrate and parallel to each other, and a protrusion made of a transparent material and arranged between the adjacent light-shielding stripes so as to refract a light beam from the base substrate in a direction close to the light-shielding stripe. For example, the transparent material is of a refractive index less than or equal to 1.

In the embodiments of the present disclosure, the parallel light-shielding stripes may be formed in a manner same as forming a black matrix, and the stripes mainly function as to shield the light beams from sub-pixels. The base substrate may be a glass substrate, and a thickness thereof is not particularly defined herein. It should be appreciated that, the glass substrate with a small thickness may provide better light transmittance. However, in order to facilitate the manufacture process, hardness of the glass substrate may also be taken into consideration. Hence, the glass substrate with an appropriate thickness may be selected in accordance with the practical need. For example, the glass substrate may be of a thickness within a range from 0.05 mm to 0.1 mm.

During the actual application, a cross section of the protrusion in a direction perpendicular to a lengthwise direction of the light-shielding strip is of a semi-circular, semi-elliptical, conical, trapezoidal or rectangular shape, and when the cross section of the protrusion is of a trapezoidal shape, a baseline of the trapezoid in contact with a surface of the base substrate is of a length greater than a length of another baseline of the trapezoid. Alternatively, when the cross section of the protrusion is of a trapezoidal shape, the trapezoid is an isosceles trapezoid.

In other words, the protrusion may have a cross section of any of various shapes, so as to refract the light beam from the sub-pixel in a better manner. Of course, during the actual application, the cross section of the protrusion is not limited to the above-mentioned shapes, and any shape may be generally applicable, as long as the protrusion is of a smooth surface and is tapered from the bottom up. In other words, the side viewing angle of the dual-viewing-angle display device may be increased as long as the light beams from the sub-pixels may be refracted in a better manner.

In the embodiments of the present disclosure, the transparent material may be a resin material which has negative photosensitivity and is currently widely used, so as to be directly exposed, thereby to form the protrusion.

Figure 2:
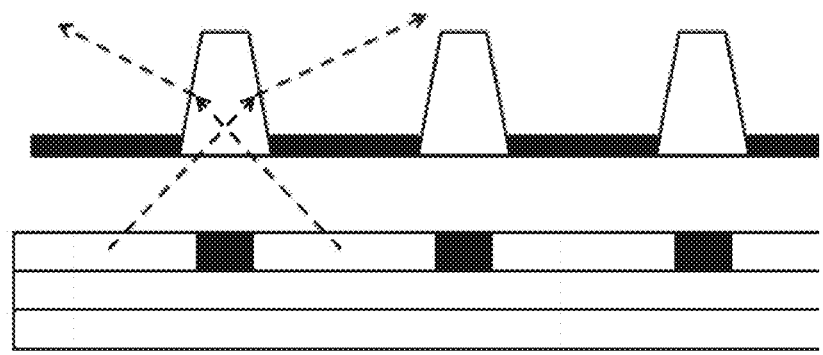
FIG. 2 is a schematic view showing fraction of light beams from sub-pixels when the light beams pass through a light refraction structure according to an embodiment of the present disclosure.

As shown in FIG. 2, which is a schematic view showing fraction of light beams from sub-pixels when the light beams pass through a light refraction structure according to an embodiment of the present disclosure, the protrusion is of an isosceles trapezoid shape, so as to provide a better refraction effect. When the light beams from the adjacent sub-pixels enter the protrusion, they may be refracted at surfaces of the transparent protrusion (i.e., interfaces between two lateral sides of the isosceles trapezoid and an ambient environment) and in directions close to the light-shielding stripes respectively. As a result, it is able to increase a side viewing angle of the dual-viewing-angle display device, thereby to enable a viewer to view an image within a larger region.

The present disclosure further provides in some embodiments a color filter substrate including the above-mentioned light refraction structure, so as to increase the side viewing angle of the dual-viewing-angle display device with the color filter substrate, thereby to enable the viewer to view an image within a larger region. During the actual application, the color filter substrate may be formed in two ways. (1) The above-mentioned light refraction structure may be directly formed on a glass substrate (i.e., a base substrate) of the color filter substrate, i.e., the light-shielding stripes and the protrusions may be formed sequentially on the glass substrate. (2) The above-mentioned light refraction structure may be formed on a separate glass substrate, and then attached directly, or adhered by an adhesive, onto the glass substrate of the color filter substrate, so as to obtain the color filter substrate. Further description will be given in conjunction with FIGS. 5 and 6.

The present disclosure further provides in some embodiments a display device including the above-mentioned light refraction structure or color filter substrate. During the actual application, in a case that the display device does not include the color filter substrate, the display device may directly include the light refraction structure. Alternatively, the display device includes the color filter substrate. The structure of the display device will not be particularly defined herein.

Figure 3:
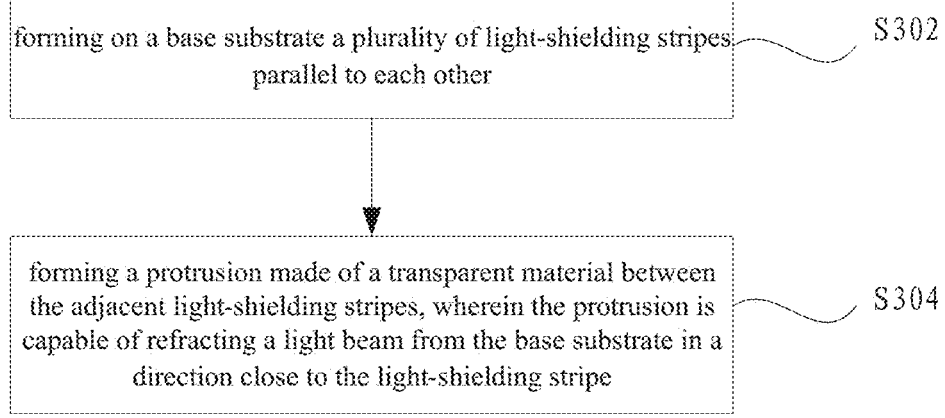
FIG. 3 is a flow chart of a method for manufacturing the light refraction structure according to an embodiment of the present disclosure.

The present disclosure further provides in some embodiments a method for manufacturing the light refraction structure which, as shown in FIG. 3, includes Step S302 of forming on a base substrate a plurality of light-shielding stripes parallel to each other, and Step S304 of forming a protrusion made of a transparent material between the adjacent light-shielding stripes, wherein the protrusion is capable of refracting a light beam from the base substrate in a direction close to the light-shielding stripe.

In Step S304, the protrusion may be formed as follows.

At first, a light refraction layer made of a transparent material is formed on the adjacent light-shielding stripes, and the transparent material may be a resin material having negative photosensitivity. Then, the light refraction layer is exposed and developed so as to obtain the protrusion. A cross section of the protrusion in a direction perpendicular to a lengthwise direction of the light-shielding strip (i.e., a lateral section of the protrusion) may be of a semi-circular, semi-elliptical, conical, trapezoidal or rectangular shape, and when the cross section of the protrusion is of a trapezoidal shape, a baseline of the trapezoid in contact with a surface of the base substrate is of a length greater than a length of another baseline of the trapezoid. Of course, during the actual application, the cross section of the protrusion is not limited to the above shapes.

During the exposing process, the light refraction layer may be exposed from one side of the base substrate opposite to the other side of the base substrate where the light refraction layer is arranged, so as to simplify a mask process and improve the production efficiency.

Figures 4, 5:
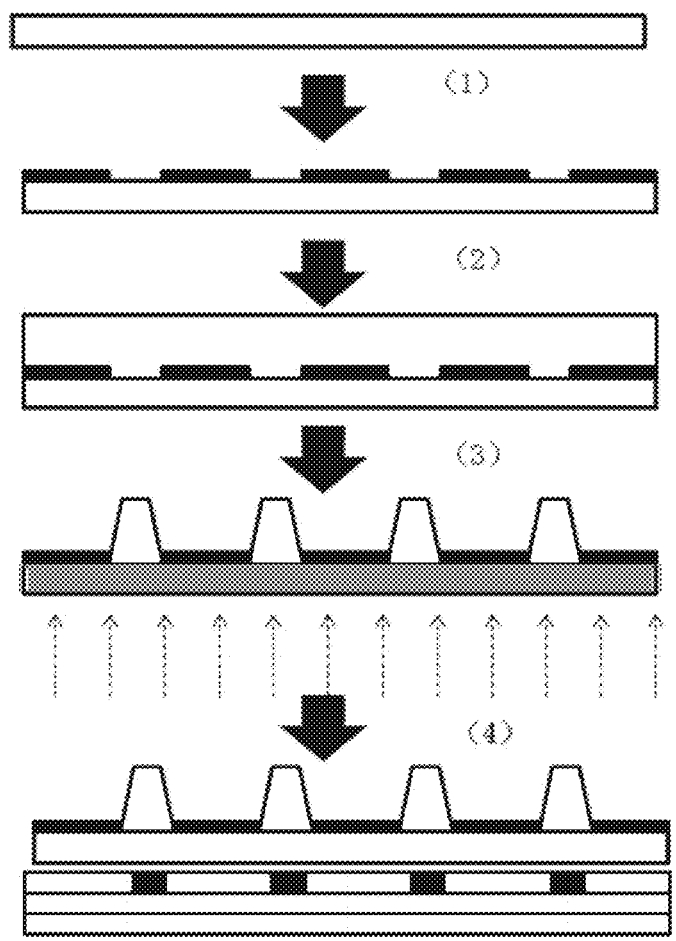
FIG. 4 is a flow chart of a method for manufacturing a color filter substrate according to an embodiment of the present disclosure.
FIG. 5 is a schematic view for manufacturing the light refraction structure on a separate glass substrate according to an embodiment of the present disclosure.

The present disclosure further provides in some embodiments a method for manufacturing the color filter substrate which, as shown in FIG. 4, includes Step S402 of forming on a base substrate of the color filter substrate a plurality of light-shielding stripes parallel to each other, and Step S404 of forming a protrusion made of a transparent material between the adjacent light-shielding stripes, wherein the protrude is capable of refracting a light beam from the base substrate in a direction close to the light-shielding stripe.

In Step S404, the protrusion may be formed as follows.

At first, a light refraction layer made of the transparent material is formed on the adjacent light-shielding stripes, and the transparent material may be a resin material having negative photosensitivity. Then, the light refraction layer is exposed and developed so as to obtain the protrusion. A cross section of the protrusion in a direction perpendicular to a lengthwise direction of the light-shielding strip may be of a semi-circular, semi-elliptical, conical, trapezoidal or rectangular shape, and when the cross section of the protrusion is of a trapezoidal shape, a baseline of the trapezoid in contact with a surface of the base substrate is of a length greater than a length of another baseline of the trapezoid. Of course, during the actual application, the cross section of the protrusion is not limited to the above shapes.

The method for manufacturing the light refraction structure will be described hereinafter in conjunction with FIGS. 5 and 6. As shown in FIG. 5, which is a schematic view for manufacturing the light refraction structure on a separate glass substrate, the method may include the following steps. (1) A layer of parallel light-shielding stripes may be formed on a thin glass substrate (i.e., the separate glass substrate). (2) Then, the light refraction layer (i.e., an intermediate layer for forming the protrusion) may be formed on the surfaces of the light-shielding stripes by spinning. (3) Next, the light refraction layer may be developed and exposed from a side of the glass substrate opposite to the other side of the glass substrate where the light refraction layer is arranged, so as to form a transparent isosceles trapezoid structure (i.e., the protrusion with a cross section in the form of an isosceles trapezoid). (4) Then, the entire light refraction structure including the glass substrate, the light-shielding stripes and the protrusions are attached, or adhered by an adhesive, onto a liquid crystal display (LCD) panel (e.g., the LCD panel with the above-mentioned color filter substrate), so as to obtain the dual-viewing-angle display device with an increase side viewing angle.

Of course, the light refraction structure may also be attached, or adhered by an adhesive, onto the color filter substrate after the light refraction structure has been formed on the separate glass substrate, which is equivalent to the formation of the color filter substrate having the above mentioned light refraction structure.

Figure 6:
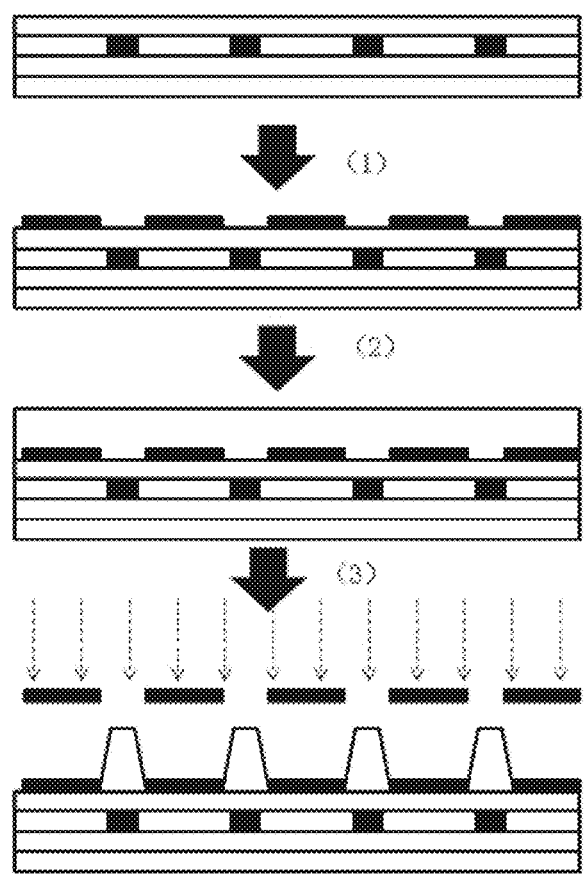
FIG. 6 is a schematic view for manufacturing the light refraction structure on a glass substrate of the color filter substrate according to an embodiment of the present disclosure.

As shown in FIG. 6, which is a schematic view for manufacturing the light refraction structure on the glass substrate of the color filter substrate according to an embodiment of the present disclosure, the method may include the following steps. (1) The parallel light-shielding stripes may be formed on the glass substrate of the color filter substrate (a thickness of the glass substrate may have been reduced). (2) Then, the light refraction layer (i.e., an intermediate layer for forming the protrusion) may be formed on the surfaces of the light-shielding stripes by spinning. (3) Next, the light refraction layer may be developed and exposed from a side of the glass substrate where the light refraction layer is arranged, so as to form a transparent isosceles trapezoid structure (i.e., the protrusion with a cross section in the form of an isosceles trapezoid), so as to form the above-mentioned light refraction structure on the base substrate of the color filter substrate.

According to the embodiments of the present disclosure, the protrusion made of a transparent material may be arranged on the grating structure, so as to form the light refraction structure. As a result, it is able to increase the side viewing angle of the dual-viewing-angle display device, and prevent the occurrence of color crosstalk in a middle region in front of the dual-viewing-angle display device. In addition, it is unnecessary to excessively reduce the thickness of the glass substrate, so it is able to improve the production efficiency and simplify the entire manufacture process.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A light refraction structure, comprising:
    a base substrate;
    a plurality of light-shielding stripes arranged on the base substrate and parallel to each other; and
    a protrusion made of a transparent material and arranged between the adjacent light-shielding stripes in the plurality of light-shielding stripes, wherein the protrusion directly contacts an entirety of a surface of the base substrate between the adjacent light-shielding stripes, the plurality of light-shielding stripes directly contact the base substrate, and the protrusion is capable of refracting a light beam from the base substrate in a direction close to the light-shielding stripe.

2. The light refraction structure according to claim 1, wherein the transparent material is a resin material having negative photosensitivity.

3. The light refraction structure according to claim 1, wherein the transparent material is of a refractive index less than or equal to 1.

4. The light refraction structure according to claim 1, wherein a cross section of the protrusion in a direction perpendicular to a lengthwise direction of the light-shielding strip is of a shape of a semi-circle, a semi-ellipse, a conoid, a trapezoid or a rectangle, and when the cross section of the protrusion is of the shape of the trapezoid, a baseline of the trapezoid in contact with a surface of the base substrate is of a length greater than a length of another baseline of the trapezoid.

5. The light refraction structure according to claim 4, wherein when the cross section of the protrusion is of the shape of the trapezoid, the trapezoid is an isosceles trapezoid.

6. The light refraction structure according to claim 1, wherein the base substrate is a glass substrate.

7. The light refraction structure according to claim 6, wherein the glass substrate is of a thickness greater than or equal to 0.05 mm and less than or equal to 0.1 mm.

8. A display device, comprising the light refraction structure according to claim 1.

9. The display device according to claim 8, wherein the display device is a dual-viewing-angle display device.

10. A color filter substrate on which the light refraction structure according to claim 1 is formed, wherein the base substrate of the light refraction structure is a base substrate of the color filter substrate.

11. The color filter substrate according to claim 10, wherein a black matrix and a color filter are arranged at a side of the base substrate away from the light refraction structure.

12. The color filter substrate according to claim 10, wherein a cross section of the protrusion in a direction perpendicular to a lengthwise direction of the light-shielding strip is of a shape of a semi-circle, a semi-ellipse, a conoid, a trapezoid or a rectangle, and when the cross section of the protrusion is of the shape of the trapezoid, a baseline of the trapezoid in contact with a surface of the base substrate is of a length greater than a length of another baseline of the trapezoid.

13. A display device, comprising the color filter substrate according to claim 10.

14. The display device according to claim 13, wherein the display device is a dual-viewing-angle display device.

15. A method for manufacturing a light refraction structure, comprising steps of:
    forming on a base substrate a plurality of light-shielding stripes parallel to each other; and
    forming a protrusion made of a transparent material between the adjacent light-shielding stripes in the plurality of light-shielding stripes, wherein the protrusion directly contacts an entirety of a surface of the base substrate between the adjacent light-shielding stripes, the plurality of light-shielding stripes directly contact the base substrate, and the protrusion is capable of refracting a light beam from the base substrate in a direction close to the light-shielding stripe.

16. The method according to claim 15, wherein the step of forming the protrusion made of the transparent material between the adjacent light-shielding stripes comprises:
    forming a light refraction layer made of the transparent material on the adjacent light-shielding stripes; and
    exposing and developing the light refraction layer to obtain the protrusion,
    wherein the transparent material is a resin material having negative photosensitivity,
    a cross section of the protrusion in a direction perpendicular to a lengthwise direction of the light-shielding strip is of a shape of a semi-circle, a semi-ellipse, a conoid, a trapezoid or a rectangle, and
    when the cross section of the protrusion is of the shape of the trapezoid, a baseline of the trapezoid in contact with a surface of the base substrate is of a length greater than a length of another baseline of the trapezoid.

17. The method according to claim 16, wherein the step of exposing the light refraction layer comprises exposing the light refraction layer from a side of the base substrate opposite to another side of the base substrate where the light refraction layer is arranged.

18. A method for manufacturing a color filter substrate, comprising steps of:
    forming on a base substrate of the color filter substrate a plurality of light-shielding stripes parallel to each other; and
    forming a protrusion made of a transparent material between the adjacent light-shielding stripes in the plurality of light-shielding stripes, wherein the protrusion directly contacts an entirety of a surface of the base substrate between the adjacent light-shielding stripes, the plurality of light-shielding stripes directly contact the base substrate, and the protrusion is capable of refracting a light beam from the base substrate in a direction close to the light-shielding stripe.

19. The method according to claim 18, wherein the step of forming the protrusion made of the transparent material between the adjacent light-shielding stripes comprises:

forming a light refraction layer made of the transparent material on the adjacent light-shielding stripes; and exposing and developing the light refraction layer to obtain the protrusion, wherein the transparent material is a resin material having negative photosensitivity, a cross section of the protrusion in a direction perpendicular to a lengthwise direction of the light-shielding strip is of a shape of a semi-circle, a semi-ellipse, a conoid, a trapezoid or a rectangle, and when the cross section of the protrusion is of the shape of the trapezoid, a baseline of the trapezoid in contact with a surface of the base substrate is of a length greater than a length of another baseline of the trapezoid.

20. The method according to claim 19, wherein the step of exposing and developing the light refraction layer comprises exposing and developing the light refraction layer from a side of the base substrate where the light refraction layer is arranged.

\* \* \* \* \*